(12) United States Patent
Obukhov et al.

(10) Patent No.: US 11,941,512 B2
(45) Date of Patent: Mar. 26, 2024

(54) NEURAL NETWORK ENGINE UTILIZING A SERIAL BUS

(71) Applicant: Western Digital Technologies, Inc., San Jose, CA (US)

(72) Inventors: Dmitry Obukhov, San Jose, CA (US); Anshuman Singh, San Jose, CA (US); Anuj Awasthi, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 1113 days.

(21) Appl. No.: 16/453,735

(22) Filed: Jun. 26, 2019

(65) Prior Publication Data

US 2020/0410326 A1 Dec. 31, 2020

(51) Int. Cl.
*G06N 3/04* (2023.01)
*G06F 13/38* (2006.01)
(Continued)

(52) U.S. Cl.
CPC ........... *G06N 3/063* (2013.01); *G06F 13/385* (2013.01); *G06N 3/04* (2013.01); *G06N 3/08* (2013.01)

(58) Field of Classification Search
CPC ........ G06N 3/0454; G06N 3/08; G06N 20/00; G06N 3/084; G06N 3/04; G06N 3/0445; G06N 3/063; G06N 3/02; G06N 3/088; G06N 20/10; G06N 5/04; G06N 3/10; G06N 7/00; G06N 5/00; G06N 7/06; G06N 3/00; G06N 10/00; G06N 99/00; G06K 9/6267; G06K 9/00288; G06T 2207/20084; G06T 2207/20081; G06T 1/20; G06T 1/60; G06T 1/00; G06F 16/35; G06F 30/27; G06F 16/51; G06F 3/015; G06F 16/00; G06F 13/00; G06F 16/906; G06F 16/55; G06F 2207/4824; G06F 17/00; G06F 9/50; G06F 11/3495; G06F 3/0656; G06F 9/544; G06F 9/3004; G06F 30/30; G06F 9/30098; G06F 16/65; G06F 16/45; G06F 12/0238; G06F 13/1678; G06F 16/328;
(Continued)

(56) References Cited

U.S. PATENT DOCUMENTS 5,148,385 A 9/1992 Frazier
5,337,395 A * 8/1994 Vassiliadis ............... G06N 3/04
706/42

(Continued)

OTHER PUBLICATIONS

Sze et al. Efficient Processing of Deep Neural Networks: A Tutorial and Survey (Aug. 13, 2017) (Year: 2017).*

(Continued)

*Primary Examiner* — Luis A Sitiriche
(74) *Attorney, Agent, or Firm* — Barry IP Law, P.C.

(57) ABSTRACT

Embodiments of serial neural network configuration and processing via a common serial bus are disclosed. In some embodiments, the input data and source identification data is sent to nodes of the neural network serially. The nodes can determine whether the source identification data matches with an address for the node. If the address matches, the node can store the input data in its register for further processing. In some embodiments, the serial neural network engine can include a common serial bus that can broadcast data across multiple processor chips or cores.

20 Claims, 8 Drawing Sheets

(51) Int. Cl.
*G06N 3/063* (2023.01)
*G06N 3/08* (2023.01)

(58) Field of Classification Search
CPC ............... G06F 13/1657; G06F 9/5016; G06F 13/1668; G06F 2009/45583; G06F 12/0802; G06F 15/167; G06F 12/00; G06F 15/17331; G06F 13/1663; G06F 13/16; G06F 13/4027; G06F 13/385
See application file for complete search history.

(56) References Cited

U.S. PATENT DOCUMENTS

| | | | |
|---|---|---|---|
| 5,710,869 | A | 1/1998 | Godefroy et al. |
| 6,199,057 | B1 | 3/2001 | Tawel |
| 6,804,243 | B1 | 10/2004 | Humphrey et al. |
| 2004/0181497 | A1 | 9/2004 | Dodgson |
| 2011/0142066 | A1* | 6/2011 | Kasai ................. H04L 12/4035 370/442 |
| 2018/0285254 | A1* | 10/2018 | Baum .................. G06F 9/5027 |
| 2019/0050717 | A1 | 2/2019 | Temam et al. |

OTHER PUBLICATIONS

International Search Report and Written Opinion dated Mar. 9, 2020 from counterpart International Application No. PCT/US2019/066981, 11 pages.

\* cited by examiner

NEURAL NETWORK ENGINE UTILIZING A SERIAL BUS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

The present disclosure relates to a neural network engine, and more particularly, to processing data serially in a neural network engine via a common serial bus.

BACKGROUND

Computer learning models can process large volumes of data. For example, a model may be implemented as an artificial neural network. Artificial neural networks are artificial in the sense that they are computational entities, inspired by biological neural networks but modified for implementation by computing devices. A neural network typically comprises an input layer, one or more hidden layer(s) and an output layer. The nodes in each layer connect to nodes in the subsequent layer and the strengths of these interconnections are typically learnt from data during the training process. Once trained, a neural network can be used for inference, that is, provided with new input data in order to predict the corresponding output.

Machine learning techniques, such as neural networks, are frequently being utilized by modern computing systems. These technologies can operate on large data sets and thus can require large amounts of storage space. However, current memory architectures do not allow for scalability of big data analysis. The present disclosure addresses these and other problems.

SUMMARY

The systems, methods, and devices of this disclosure each have several innovative aspects, no single one of which is solely responsible for the all of the desirable attributes disclosed herein.

A system of performing neural network computations can comprise: an input interface configured to receive input data for neural network processing; and a common serial bus configured to serially transmit the input data and a first source identification data to a plurality of nodes of a neural network, wherein in response to the input data and the first source identification data being serially transmitted from the common serial bus, a count is incremented; wherein: each node of the plurality of nodes is configured to, in response to a condition being met, store at least a portion of the input data in a register of the node; and the neural network is configured to, in response to the count meeting a threshold: transmit, from the nodes that stored the input data, the input data to a transfer function; receive an output of the transfer function; add a second source identification data to the output of the transfer function; and transmit the output of the transfer function with the second source identification data to each node of the plurality of nodes via the common serial bus.

In the system of the preceding paragraph or any of the paragraphs herein, the system can further comprise a processor configured to load a pre-determined neural network with pre-determined weightings.

In the system of the preceding paragraph or any of the paragraphs herein, the system can further comprise a processor configured to: receive, via the input interface, one or more configuration parameters for the neural network; and dynamically configure weightings for the neural network based on the one or more configuration parameters.

In the system of the preceding paragraph or any of the paragraphs herein, the system can further comprise a processor that is configured to store data in response to the data corresponding to a particular source.

In the system of the preceding paragraph or any of the paragraphs herein, each node of the plurality of nodes can further be configured to store a plurality of data in response to the data corresponding to any of a plurality of predetermined sources.

In the system of the preceding paragraph or any of the paragraphs herein, the condition can include matching source data identifying a node to the first source identification data.

In the system of the preceding paragraph or any of the paragraphs herein, the common serial bus can be configured to transmit data to each node of the plurality of nodes without storing the data in memory.

A method of performing neural network computations can comprise: receiving input data for processing in a neural network comprising a plurality of nodes; transmitting the input data and first source identification data to the plurality of nodes via a common serial bus, wherein the common serial bus serially transmits the input data and the first source identification data to the plurality of nodes; for each node of the plurality of nodes, in response to a condition being met: storing at least a portion of the input data in a register of the node of the plurality of nodes; and incrementing a count; and in response to the count satisfying a threshold: transmitting, from the nodes that stored the input data, the input data to a transfer function; receiving an output of the transfer function; adding a second source identification data to the output of the transfer function; and transmitting the output of the transfer function with the second source identification data to each node of the plurality of nodes via the common serial bus.

In the method of the preceding paragraph or any of the paragraphs herein, the common serial bus can transmit the input data and the first source identification data to each node of the plurality of nodes without storing the input data or the first source identification data in memory.

In the method of the preceding paragraph or any of the paragraphs herein, the method can further comprise, by the common serial bus, broadcasting any data received to each of the plurality of nodes.

In the method of the preceding paragraph or any of the paragraphs herein, the plurality of nodes can include at least one node of an input layer of the neural network, at least one node of an output layer of the neural network, and at least one node of a hidden layer of the neural network.

In the method of the preceding paragraph or any of the paragraphs herein, the method can further comprise the input data can correspond to pixels of an image, and wherein the common serial bus transmitting the input data and the first source identification data serially includes transmitting each pixel of the image the input data serially to each node of the plurality of nodes.

In the method of the preceding paragraph or any of the paragraphs herein, the plurality of nodes can be disposed across a plurality of hardware processor chips or processor cores including a first and second hardware chip or processor core.

In the method of the preceding paragraph or any of the paragraphs herein, the method can further comprise, by the common serial bus, broadcasting the input data and the first source identification data to the nodes disposed on the first hardware chip or processor core and the second hardware chip or processor core.

In the method of the preceding paragraph or any of the paragraphs herein, the method can further comprise generating routing data, and broadcasting, by the common serial bus, the routing data with the input data and the first source identification data to each of the nodes of the plurality of nodes.

In the method of the preceding paragraph or any of the paragraphs herein, the method can further comprise, in response to receiving output of the transfer function, resetting the count.

In the method of the preceding paragraph or any of the paragraphs herein, the condition can include matching source data identifying a node to the first source identification data.

A system for performing neural network computations can comprise: means for receiving input data for processing by a neural network comprising a plurality of node; means for transmitting serially the input data and first source identification data to the plurality of nodes; and means for processing, for each node of the plurality of nodes, in response to a condition being met: storing at least a portion of the input data; and incrementing a count, means for processing further for, in response to the count meeting a threshold: receiving an output of a transfer function; and adding a second source identification data to the output of the transfer function, and means for transmitting further for serially transmitting the output of the transfer function with the second source identification data to each of the nodes of the plurality of nodes.

In the system of the preceding paragraph or any of the paragraphs herein, the condition can include matching source data identifying a node to the first source identification data.

In the system of the preceding paragraph or any of the paragraphs herein, the means for transmitting can be further for transmitting the input data and the first source identification data to each node of the neural network without storing the data in memory.

BRIEF DESCRIPTION OF DRAWINGS

Embodiments of various inventive features will now be described with reference to the following drawings and appendices. Throughout the drawings, reference numbers may be re-used to indicate correspondence between referenced elements. The drawings are provided to illustrate example embodiments described herein and are not intended to limit the scope of the disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Existing neural networks require a lot of connections between nodes, especially for wide networks with lots of hidden layers, and many nodes within each layer. As such, for each connection between nodes, existing neural networks may require a dynamic random access memory (DRAM) bus and store the data in DRAM intermittently as a means to pass data in the connection. In some implementations where nodes are implemented in certain logic configurations, each connection between the nodes may require a physical connection between the nodes. Moreover, networks typically require all input information upfront and at the same time. However, not all information is often available at the same time, for example, because a lot of other processing is performed on the device at different speeds and data may be passed via serial interfaces. Another issue with existing neural networks is that the processing done in parallel often requires multiple processors, which leads to high computational power requirements.

The systems and methods described herein can reduce and/or eliminate the drawbacks described above. A serial neural network can pass information to the nodes via a common serial bus. The data can be passed serially. For example, in certain embodiments, some or all of the nodes of the neural network can receive first data via the common serial bus. Each of some or all of the nodes can determine whether it is to store the first data in the node's register for future processing. For example, the node can assess source identification information corresponding to the first data and determine whether the source of the first data matches an address for that node. The serial neural network can receive second data and pass the second data to each node, and each node can determine whether the node should store the second data based on the source identification corresponding to the second data. Then when all of the information sufficient for processing is received, the neural network can process the data. The address for the node indicates one or more addresses that the node is to store data for. For example, all nodes in the first hidden layer of a neural network correspond to addresses for all nodes of the input layer, and thus these nodes only store data coming from the input layer. This data can include the first and second data described above, that can be passed serially to the nodes, and can indicate that the first and second data corresponds to an address of the input layer. Second hidden layer nodes correspond with addresses of the first hidden layer nodes. Thus, the second hidden layer nodes store data coming from nodes of the first hidden layer.

Generally, as described herein, neural networks, including but not limited to deep neural networks ("DNNs"), have multiple layers of nodes. Illustratively, a neural network may include an input layer, and output layer, and any number of intermediate, internal, or "hidden" layers between the input and output layers. The individual layers may include any number of separate nodes. Nodes of adjacent layers may be logically connected to each other, and each logical connection between the various nodes of adjacent layers may be associated with a respective weight. Conceptually, a node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer. Each node passes the result of this weighted sum of inputs through a non-linear function (such as a sigmoid, tangent hyperbolic, RELU, and/or the like) before sending its output to the next layer nodes.

The nodes in each layer connect to some (e.g., partially connected layers) or all (e.g., fully connected layers) of the nodes in the subsequent layer and the weights of these connections are typically learnt from data during the training process, for example through backpropagation in which the network parameters are tuned to produce expected outputs given corresponding inputs in labeled training data. Thus, the artificial neural network is an adaptive system that is configured to change its structure (e.g., the connection configuration and/or weights) based on information that flows through the network during training, and the weights of the hidden layers can be considered as an encoding of meaningful patterns in the data.

The parameters of a neural network can be set in a process referred to as training. For example, a neural network can be trained using training data that includes input data and the correct or preferred output of the model for the corresponding input data. Sets of individual input vectors ("mini-batches") may be processed at the same time by using an input matrix instead of a single input vector, which may speed up training. The neural network can repeatedly process the input data, and the parameters (e.g., the weight matrices) of the neural network can be modified in what amounts to a trial-and-error process until the model produces (or "converges" on) results substantially close to the correct or preferred output. The modification of weight values may be performed through a process referred to as "backpropagation." Backpropagation includes determining the difference between the expected model output and the obtained model output, and then determining how to modify the values of some or all parameters of the model to reduce the difference between the expected model output and the obtained model output.

Although described within the context of neural networks, it will be appreciated that the training and/or interference concepts described herein could be applied to other machine learning models including decision trees, semi-supervised expectation maximization functions, and/or the like.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrative only, and are not intended to be limiting.

Overview

Figure 1:
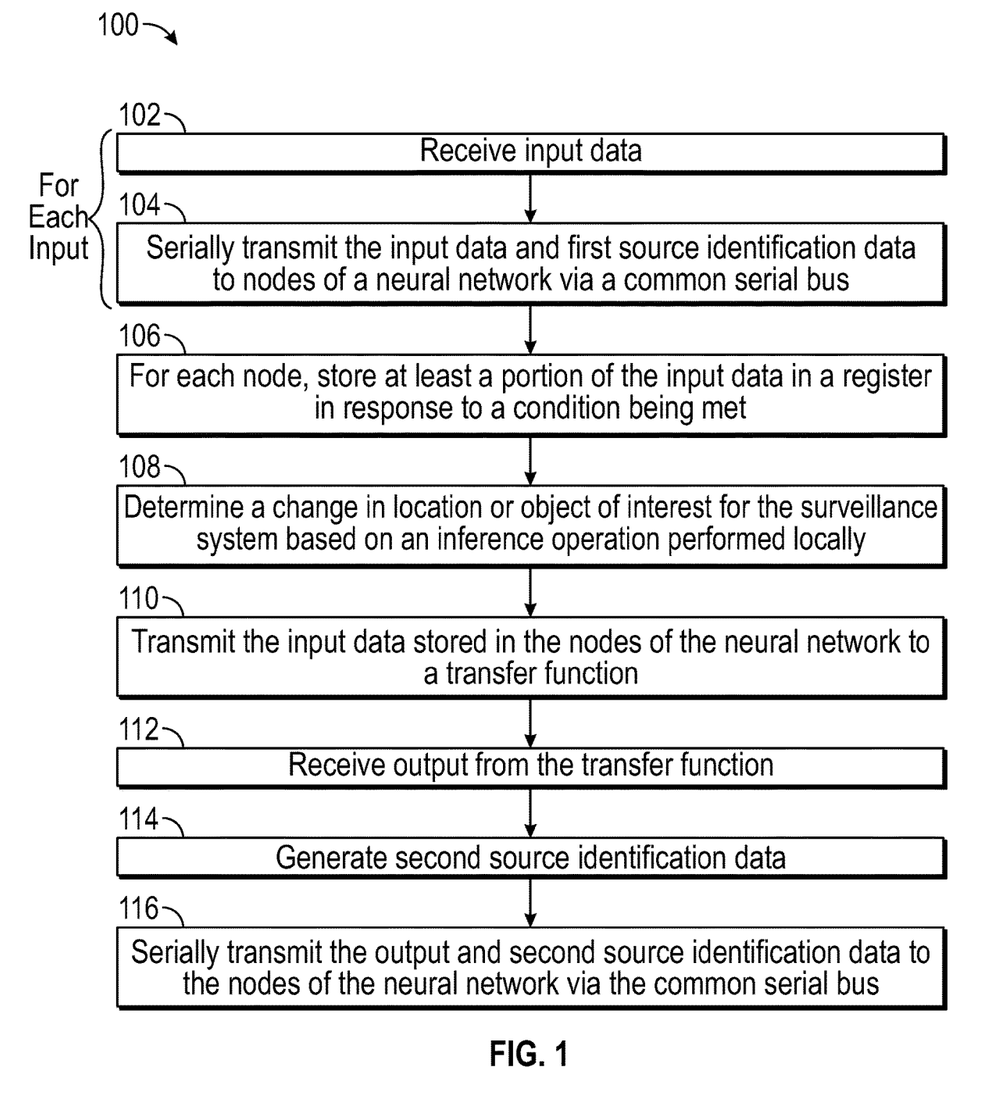
FIG. 1 depicts a flow diagram of serially processing data through a neural network engine.

FIG. 1 depicts a flow diagram 100 of serially processing data through a neural network engine according to one embodiment. The process 100 can be implemented by any system that can process a neural network. For example, the process 100, in whole or in part, can be implemented by the serial neural network engine or other computing system. Although any number of systems, in whole or in part, can implement the process 100, to simplify discussion, the process 100 will be described with respect to particular systems. Further, although the process 100 may be performed with respect to variations of systems comprising neural network engines, to simplify discussion, the process 100, will be described with respect to the serial neural network engine.

At block 102, for each input, the process 100 can receive input data. For example, the process 100 can receive data at a serial neural network engine interface and/or an input layer of the neural network. The data can include data for processing through the neural network. For example, the process 100 can receive image data for inference operations to be performed in the neural network.

At block 104, for each input, process 100 can serially transmit the input data and/or first source identification data to nodes of the neural network via a common serial bus. The process 100 can receive data serially, such as receiving data serially at block 102, and a common serial bus of a serial neural network engine can transmit the data serially to each node of the neural network. For example, each pixel of the input data image can be received by the process 100, and the common serial bus can transmit each pixel data to each node with the source identification data.

At block 106, each node of the process 100 can receive each data serially with the source identification information. Each node can store at least a portion of the input data in a register in response to a condition being met. For example, each node can be configured to store data received if the source identification data matches a predetermined source. Although all nodes may receive the input data, only the nodes that are supposed to process the data will store the data for processing.

At block 108, the process 100 can increment a count for each data passed serially to each neural network. For example, after a first pixel is passed, the count is increased to four. For a four-pixel image, the process 100 can transmit each pixel serially, and the process 100 can increment the count up to four.

At block 110, the process 100 can transmit the input data stored in the nodes of the neural network to one or more transfer functions to perform analysis on the received data. In line with the example above, for a four-pixel image input, the process 100 can continue to increment the count after passing each pixel data serially. Once the count is four, the process 100 can initiate processing of the four-pixel data by transmitting the input data to a transfer function.

At block 112, the process 100 can receive output data from the transfer function. The transfer function can represent a function performed for one or more nodes and/or a function for a layer of the neural network. For example, the one or more transfer functions can include an inference operation performed for the first layer of the serial neural network engine.

At block 114, the process 100 can generate second source identification data. If a first node stores the input data at block 106, and the input data is processed by a transfer function, the process 100 can generate second source identification data including an address and/or other identification information for the first node.

At block 116, the process 100 can serially transmit the output and the second source identification data to the nodes of the neural network via a common serial bus. For example, after processing the first layer of the neural network via the one or more transfer functions at block 110 and 112, the process 100 can generate source identification information that indicates which node the output of the first layer came from. The process 100 can then transmit the output of the first layer serially to every node of the neural network. The nodes on the second layer of the neural network can store the input data in its register because the received input data is from the nodes of the first layer, indicated by the second source identification data.

Serial Neural Network Engine

Figure 2:
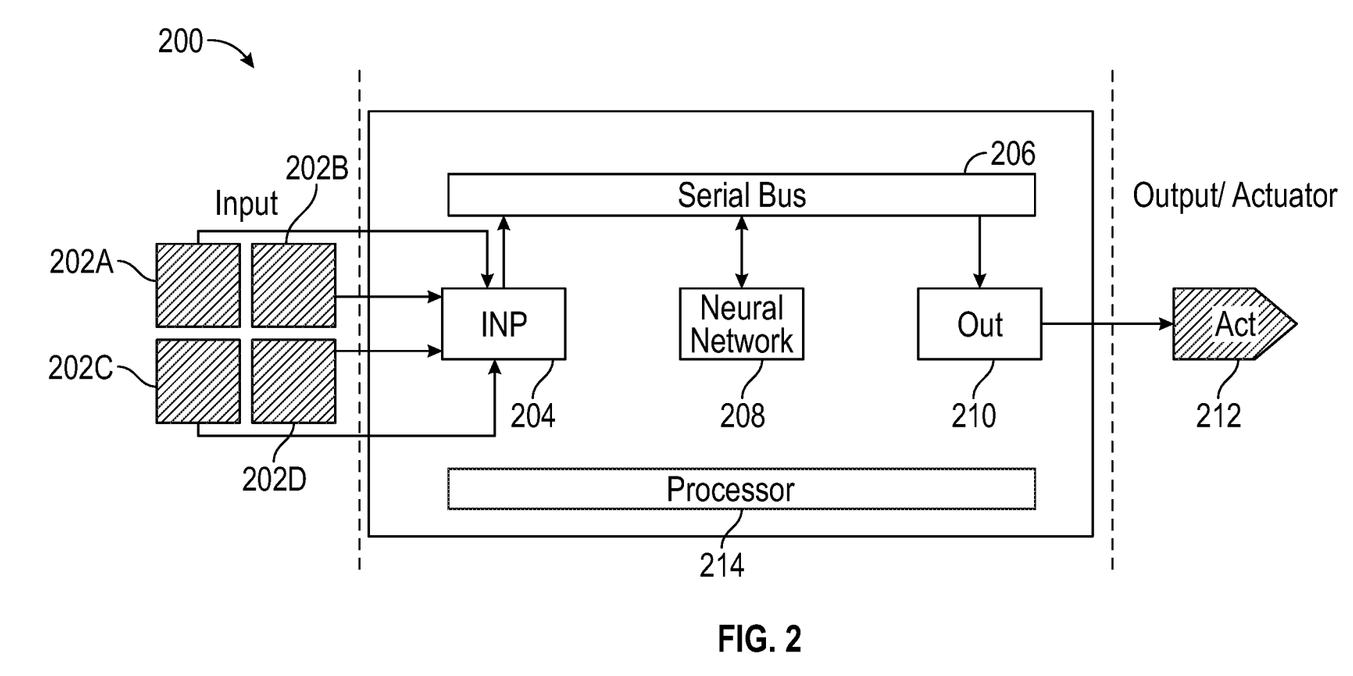
FIG. 2 depicts a block diagram of a serial neural network engine.

FIG. 2 depicts a block diagram 200 of a serial neural network engine according to one embodiment. In the block diagram 200, the serial neural network engine can include an input layer 204, a serial bus 206 such as a common serial bus, a neural network 208, and an output layer 210. In some cases, the serial neural network of block diagram 200 can include more or less components. In some cases, the features described for FIG. 2 can include one or more features for the serial neural network of block diagrams described in other figures. For example, the common serial bus described in FIG. 2 can include one or more features for the common serial bus described in other figures.

In some cases, the input data 202A, 202B, 202C, 202D (collectively referred to herein as input data 202) can include data for processing in a neural network. For example, the input data 202 can include a four-pixel image, a first pixel 202A, a second pixel 202B, a third pixel 202C, and a fourth pixel 202D. The pixels 202 can be sent to the input layer 204 of the neural network and/or an input interface for the serial neural network engine. The input layer 204 can receive the pixels 202 serially.

In some cases, the serial neural network engine can include a single interface for input data, where the data is received serially at the input layer. The serial neural network engine can pass the input data 202 serially to the serial bus 206. For example, a 2×2 pixel input can be broken into 4 messages, and each of the 4 messages can be sent to the serial bus 206 serially, one by one.

In some cases, the serial bus 206 can broadcast the input data 202 serially to each node of the neural network 208. Each node of some or all of the nodes of the neural network 208 can receive the input data 202 and check the corresponding source identification data with one or more addresses. If the address matches, the node stores the input data 202 in a register. That way, the nodes that are supposed to process the data that was sent from the serial bus 206 save the input data 202, for example, into the node's corresponding register. While other saving mechanisms such as volatile or non-volatile memory may be used in some embodiments, the description below will use the register implementation for illustration. In some cases, the serial bus 206 can broadcast a message with the input data 202 and source identification information serially.

In some cases, the node can save the input data 202 into a register if a destination identification data matches one or more addresses stored for the node. For example, a destination identification data can be sent with the input data 202 that indicates the destination node that the data is to be stored. In some cases, the destination identification data can used by a node on a different chip or processor core to determine whether the destination identification data matches an address corresponding to the chip or processor core, as described in FIG. 6.

In some cases, the serial neural network engine can determine to process a subset of data. For example, the input data can include 64 pixels. However, the serial neural network engine can process the input data after sending 60 pixels of data serially to each node. Advantageously, the serial neural network engine can process data faster on a subset of data that may be sufficient for neural network processing.

In some cases, the serial neural network engine can include one or more processors 214. The one or more processors 214 can execute a counter, such as a counter for each time data is passed through the serial bus 206. The one or more processors 214 can determine that after 60 counts, the neural network 208 can process the data.

In some cases, the serial neural network engine can include an output layer 210 that can receive output data of the neural network. The output layer 210 can check whether the received data is for the output layer 210, such as by checking if the source identification data matches with one or more corresponding addresses for the output layer 210. The output later 210 can send the data to an actuator 212. The actuator 212 can include a one-bit actuator control. In some cases, the serial neural network engine can include a plurality of actuators.

In some cases, the serial neural network engine does not store data between layers in an external memory of the neural network, such as a dynamic random-access memory (DRAM). Instead, the serial neural network engine stores the input data in registers within the neural network 208. In some cases, the registers include temporary memory where the next set of data that is stored overwrites the previously stored data. As DRAM can consume a high amount of power, this can provide a significant power saving over implementations that require DRAM support.

In some cases, the serial neural network can load the addresses for each node, such that each node can check the source identification information corresponding to the input data received to see if the node should store the received input data in its register.

Single Node of the Serial Neural Network Engine

Figure 3:
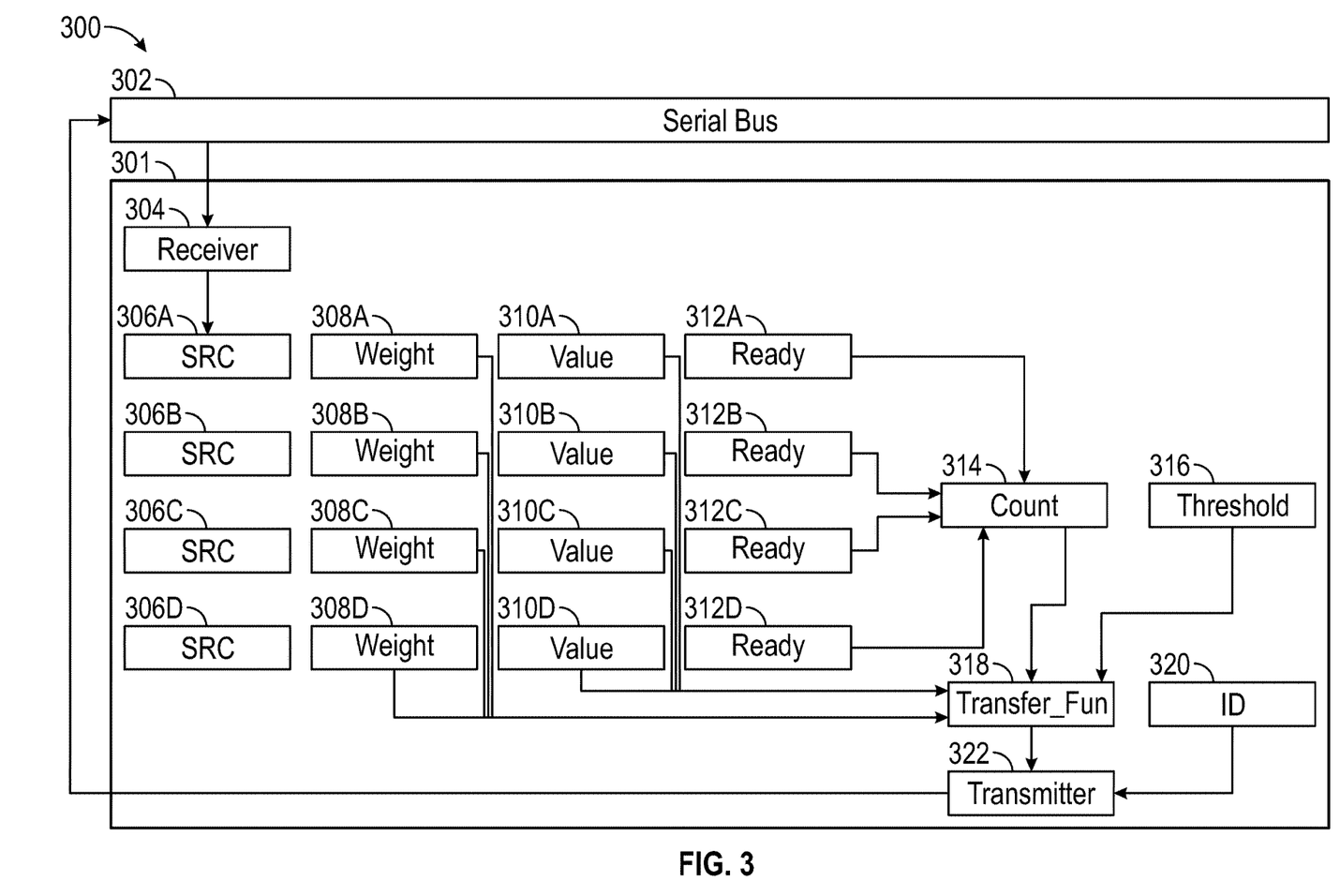
FIG. 3 depicts a block diagram of a single node of the serial neural network engine.

FIG. 3 depicts a block diagram 300 of a single node of the serial neural network engine, such as of the engine 200, according to one embodiment. In the block diagram 300, the node 301 of the serial neural network engine can connect to a serial bus 302, and/or can include a receiver 304, source addresses 306A, 306B, 306C, 306D (collectively referred to herein as source addresses 306), weights 308A, 3068B, 308C, 308D (collectively referred to herein as weights 308), saved values 310A, 310B, 310C, 310D (collectively referred to herein as values 310), a ready state 312A, 312B, 312C, 312D (collectively referred to herein as ready states 312), a count 314 from a counter, a transfer function 318, a count threshold 316, source ID data 320, and a transmitter 322. In some cases, a node 301 for the serial neural network of block diagram 300 can include more or fewer components. For example, the configuration of four elements of each of source address, weight, value and ready state shown in the figure is an example, as some nodes may have a different number of elements. In some cases, the features described for FIG. 3 can include one or more features for the serial neural network of block diagrams described in other figures. For example, the common serial bus and node configuration described in FIG. 3 can include one or more features for the common serial bus engine described in FIG. 2, and/or vice versa.

In some cases, the receiver 304 can receive data from the serial bus 302. The node 301 checks the received data with source addresses 306 with source identification data received from the serial bus 302. If the source identification data matches any of the source addresses 306, the node 301 can store the corresponding value 310 of the input data in a register, and the ready state 312 can be activated.

In some cases, the node 301 can increment a count 314 of the counter. The node 301 can have a count threshold 316, such as 60. The node 301 can process the stored values 310 in a transfer function 318 when all inputs are received and stored in the registers. The transfer function 318 can process the stored data with weights corresponding to the node 301.

In some cases, the output of the transfer function 318 is sent to a transmitter 322. The transmitter 322 can combine the output of the transfer function 318 with source identification data 320 to generate a message, and send the message to the serial bus to be transmitted to the nodes of the neural network.

In some cases, when the message is sent from the transmitter 322 to the serial bus 302, the count 314 is reset, such as being set to 0, and/or the ready states 312 can be turned off. In some cases, the ready states 312 can include a binary flag, such as on for a ready state and off for a not ready state.

Serial Broadcasting and Storage of Input Data

Figure 4A:
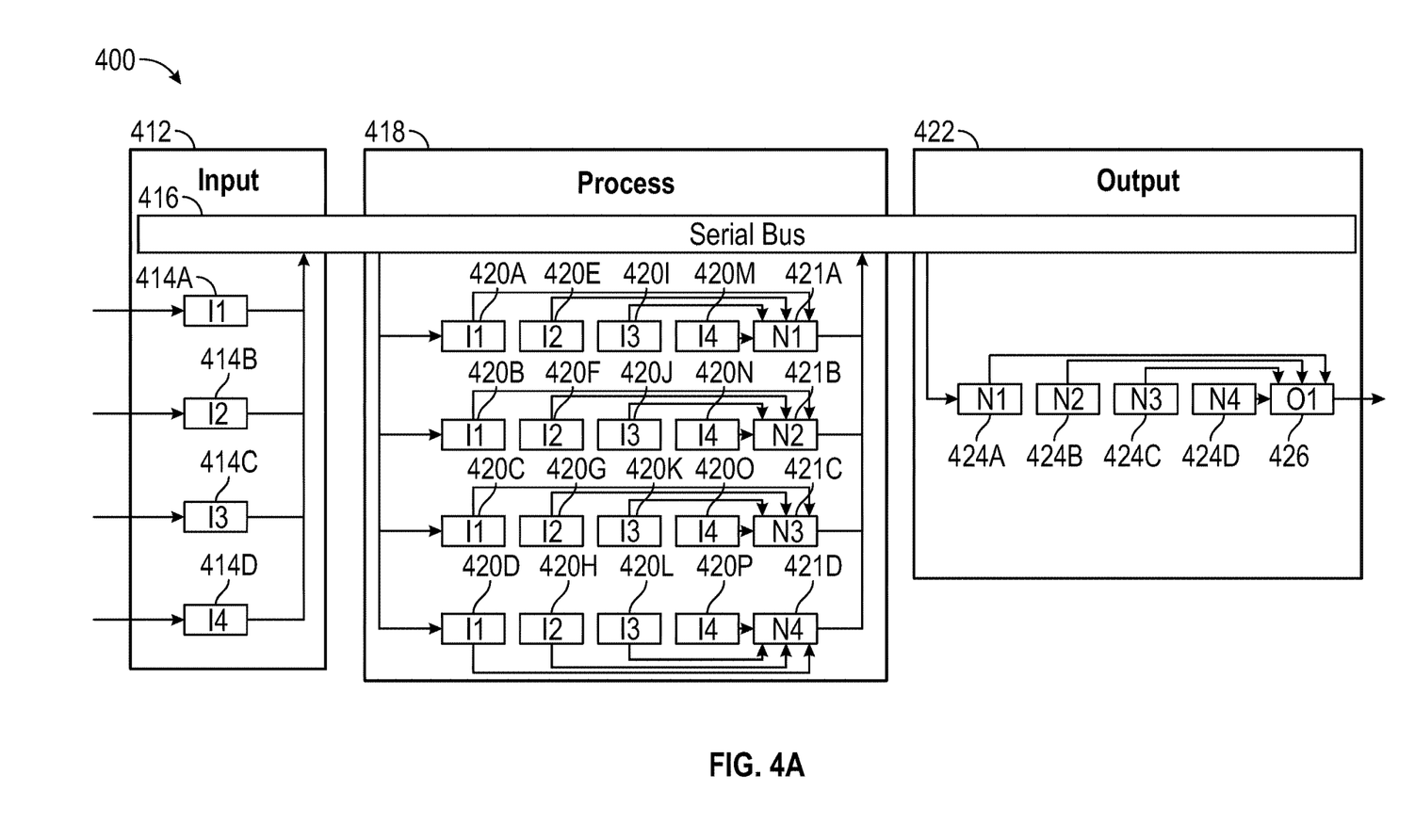
FIG. 4A depicts a block diagram of serial broadcasting and storage of input data.

FIG. 4A depicts a block diagram 400 of serial broadcasting and storage of input data according to one embodiment. In the block diagram 400, the serial neural network engine can include an input layer 412, a process layer 418, an output layer 422, and a serial bus 416. The input layer 412 can include input nodes 414A, 414B, 414C, 414D (collectively referred to herein as input nodes 414). The process layer 418 can include process nodes 421A, 421B, 421C, 421D (collectively referred to herein as process nodes 421) that each have registers 420A, 420B, 420C, 420D, 420E, 420F, 420G, 420H, 420I, 420J, 420K, 420L, 420M, 420N, 420O, 420P (collectively referred to herein as registers 420). For example, the first node N1 421A includes four registers 420A, 420E, 420I, 420M. The output layer 422 can include registers 424A, 424B, 424C, 424D (collectively referred to herein as registers 424) and an output node 426.

Figure 4B:
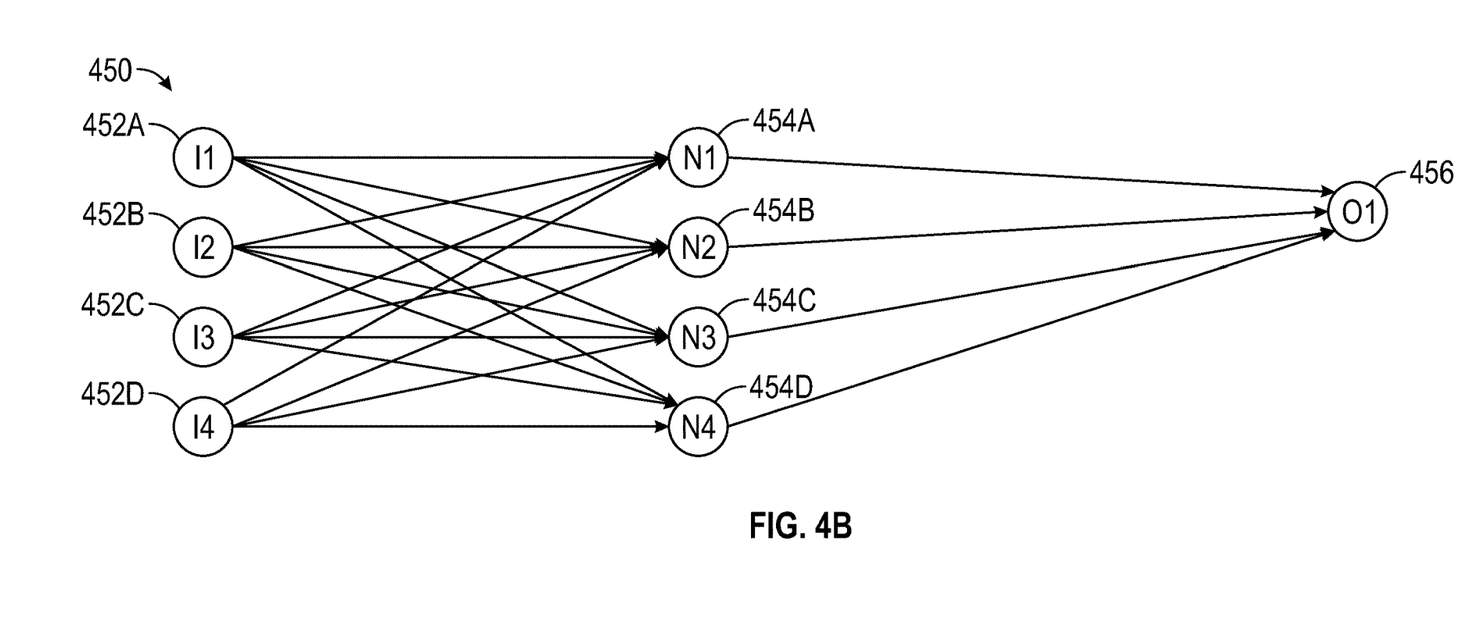
FIG. 4B depicts a block diagram of a neural network.

FIG. 4B depicts a block diagram 450 of a neural network according to one embodiment. The neural network of block diagram 450 can include four input nodes 452A, 452B, 452C, 452D (collectively referred to herein as input nodes 452), a hidden layer with hidden layer nodes 454A, 454B, 454C, 454D (collectively referred to herein as hidden layer nodes 454), and an output node 456.

In some cases, the serial neural network of block diagram 400 and/or the neural network of block diagram 450 can include more or less components. In some cases, the features described for FIGS. 4A and 4B can include one or more features for the serial neural network of block diagrams described in other figures. For example, the common serial bus described in FIG. 4A can include one or more features for the common serial bus described in other figures.

In some cases, input data 11, 12, 13, 14 are received by the input nodes 414. The serial bus 416 can receive each of the input data 11, 12, 13, 14 serially. The serial bus 416 can broadcast each of the input data 11, 12, 13, 14 serially to nodes connected to the serial bus, such as the process nodes 421. The first input 11 can be stored in the registers 420A, 420B, 420C, 420D corresponding to the process nodes 421. The nodes 421 can determine that the source identification data indicates that the data came from the input layer 412, and determine that the source identification data matches with an address for the node. For example, in relation to the block diagram 450 of FIG. 4B, the hidden layer nodes 454 are connected to each of the input nodes 452. Thus, each of the hidden layer nodes 454 should store data in their corresponding registers that have source identification data to any of the input nodes 452. For FIG. 4A, the same is repeated for the other input data 12, 13, 14, and stored in the process nodes 420.

In some cases, the serial neural network engine also broadcasts the input data to the output node 426. However, the output node 426 checks the source identification data and determines that the data came from the input layer 412, and thus does not store the data in its registers 424. In relation to FIG. 4B, the output node 456 is connected with the hidden layer nodes 454, and thus, only stores data received from the hidden layer nodes 454, and not data received from the input nodes 452. In other words, the source identification data can be used to represent the connections in the neural network.

In some cases, the serial neural network engine increases a count for each time data is passed through the serial bus 416. The serial neural network engine can determine when a count meets a count threshold, such as when the count is 4, the data is processed via a transfer function for the nodes 421. The nodes 421 then transmit the output of the transfer function to the serial bus 416. The serial bus 416 then broadcasts the output of the transfer function to the output layer 422. The output layer 422 identifies that the source identification data corresponds to the hidden layer nodes 421 and thus stores the output of the transfer function from the hidden layer nodes into its registers 424. Once the count for the output layer meets a count threshold, such as 4 after each of the outputs of the transfer functions are saved in the registers 424 serially, then the output layer 422 transmits the output.

Serial Broadcasting and Storage of Input Data

Figure 5A:
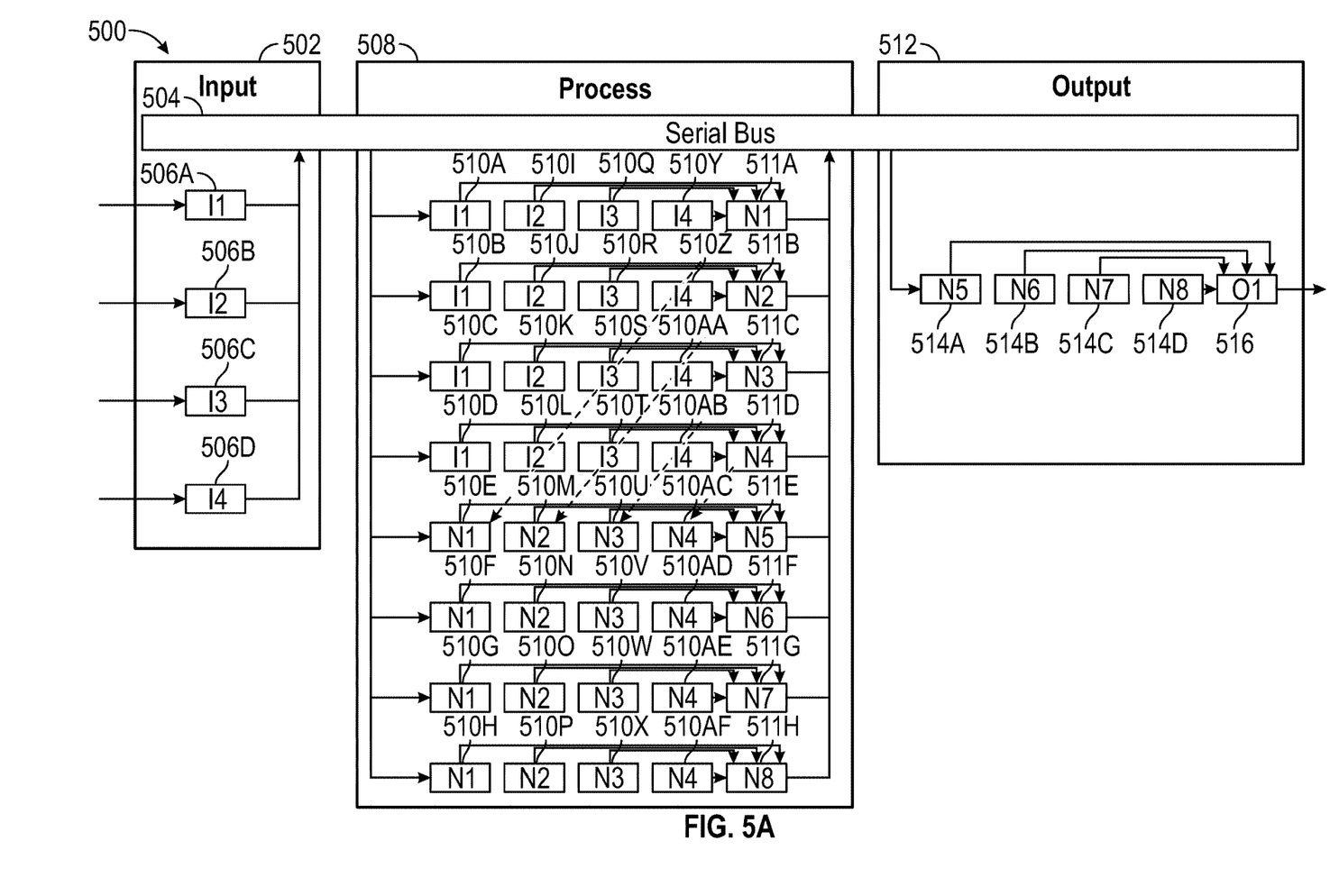
FIG. 5A depicts a block diagram of serial broadcasting and storage of input data with two hidden layers.

FIG. 5A depicts a block diagram 500 of serial broadcasting and storage of input data with two hidden layers according to one embodiment. In the block diagram 500, the serial neural network engine can include an input layer 502, a process layer 508, an output layer 512, and a serial bus 504. The input layer 502 can include input nodes 506A, 506B, 506C, 506D (collectively referred to herein as input nodes 506). The process layer 508 can include process nodes 511A-511H (collectively referred to herein as process nodes 511) each with corresponding registers 510A, 510B . . . 510AF (collectively referred to herein as registers 510). The output layer 512 can include registers 514A, 514B, 514C, 514D (collectively referred to herein as registers 514) and an output node 516.

Figure 5B:
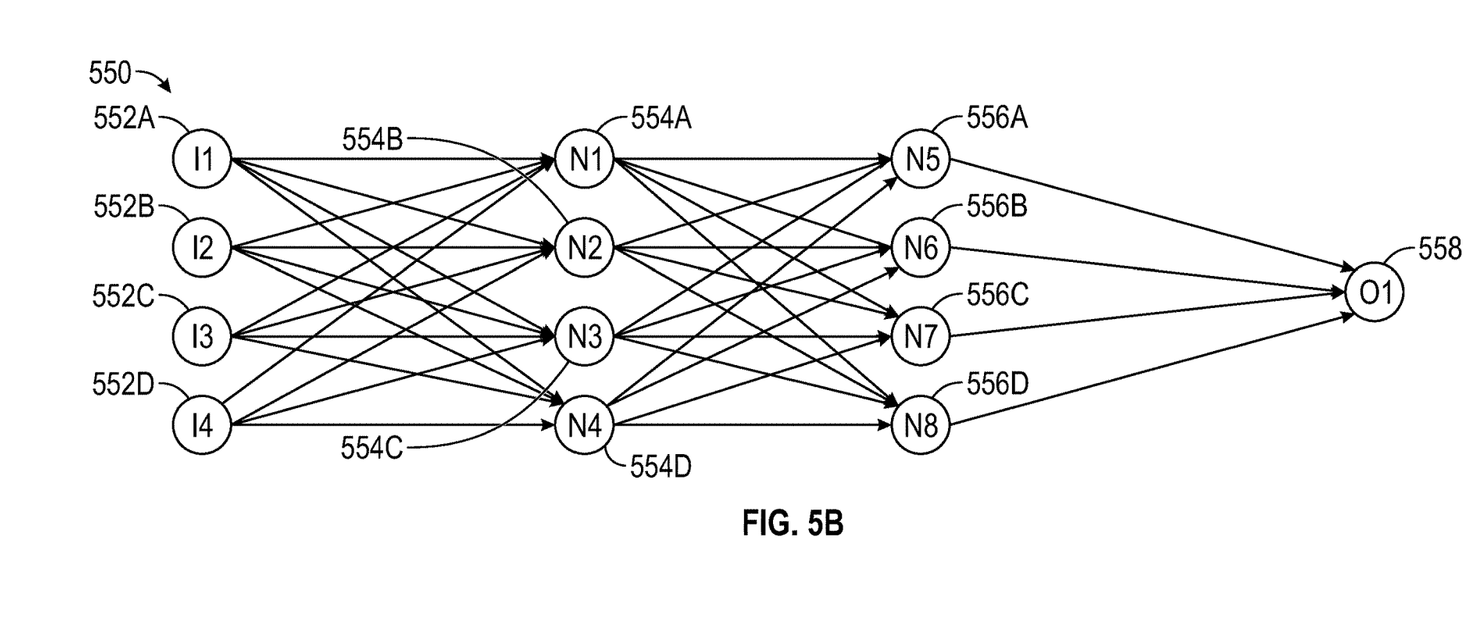
FIG. 5B depicts a block diagram of a neural network with two hidden layers.

FIG. 5B depicts a block diagram 550 of a neural network with two hidden layers according to one embodiment. The neural network of block diagram 550 can include four input nodes 552A, 552B, 552C, 552D (collectively referred to herein as input nodes 552), a first hidden layer with first hidden layer nodes 554A, 554B, 554C, 554D (collectively referred to herein as first hidden layer nodes 554), a second hidden layer with second hidden layer nodes 556A, 556B, 556C, 556D (collectively referred to herein as second hidden layer nodes 556), and an output node 558.

In some cases, the serial neural network of block diagram 500 and/or the neural network of block diagram 550 can include more or less components. In some cases, the features described for FIGS. 5A and 5B can include one or more features for the serial neural network of block diagrams described in other figures. For example, the common serial bus described in FIG. 5A can include one or more features for the common serial bus described in other figures.

In some cases, the serial neural network of block diagram 500 receives the input data 11, 12, 13, 14, transmits the input data 11, 12, 13, 14 from the input layer 502 to the serial bus 504, is received by nodes corresponding to the first hidden layer 511A, 511B, 511C, 511D, is saved in their corresponding registers 510, and is processed through transfer functions of the nodes 511A, 511B, 511C, 511D, similar to FIG. 4A.

In some cases, the serial neural network of block diagram 500 includes a second hidden layer. As shown in FIG. 5B, the second hidden layer nodes 556 are connected to the first hidden layer nodes 554. Thus, data that is received by the second hidden layer nodes 556 with source identification data that corresponds to any of the first hidden layer nodes 554 are saved in corresponding registers. For example, the output of the transfer functions for nodes 511A, 511B, 511C, 511D (which correspond to the first hidden layer nodes) are sent to the serial bus 504, and the serial bus broadcasts these outputs to all nodes. However, only the nodes that correspond to the second hidden layer, nodes 511E, 511F, 511G, 511H, save the outputs in their registers. Likewise, the output nodes of the output layer 512 store data that corresponds to source identification data of the second hidden layer nodes 511E, 511F, 511G, 511H.

Serially Broadcasting Across Multiple Chips

Figure 6:
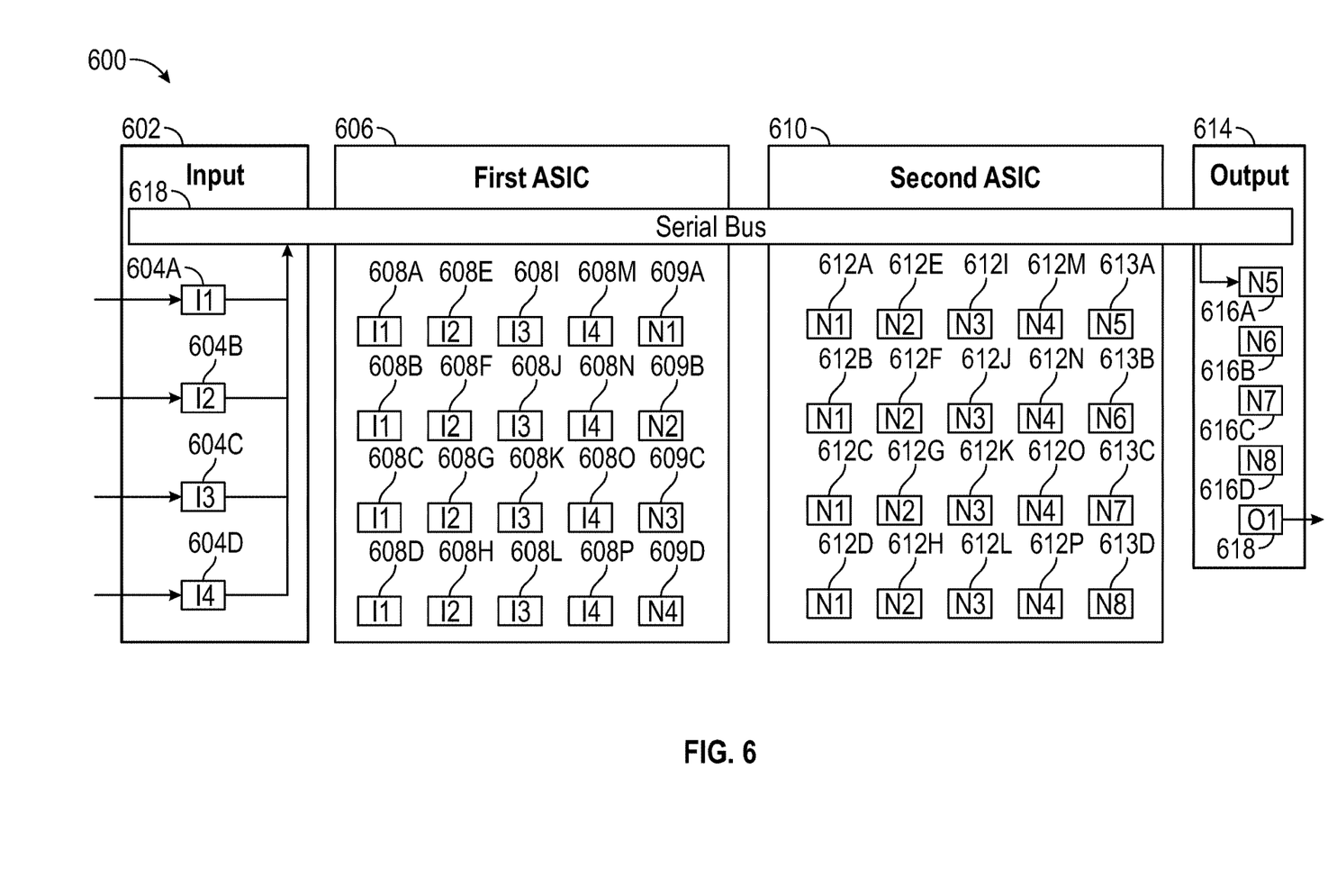
FIG. 6 depicts a block diagram of serially broadcasting across multiple chips.

FIG. 6 depicts a block diagram 600 of serially broadcasting across multiple chips according to one embodiment. In the block diagram 600, the serial neural network engine can include an input layer 602, a first hardware chip 606 (such as, an application specific integrated circuit (ASIC), field programmable gate array (FPGA), or the like), a second hardware chip 610 (such as, an ASIC, FPGA, or the like), an output layer 614, and a serial bus 618. The input layer 602 can include input nodes 604A, 604B, 604C, 604D (collectively referred to herein as input nodes 604). The first chip 606 can include first chip nodes 609A-609D (collectively referred to herein as first chip nodes 609) each with corresponding first chip registers 608A-608P (collectively referred to herein as first chip registers 608). The second chip 610 can include second chip nodes 613A-613D (collectively referred to herein as first chip nodes 613) each with corresponding second chip registers 612A-612P (collectively referred to herein as second chip registers 612). The output layer 614 can include registers 616A, 616B, 616C, 616D (collectively referred to herein as registers 616) and an output node 618. In other embodiments, a chip may be substituted by a processor core.

In some cases, the serial neural network of block diagram 600 can include more or less components. In some cases, the features described for FIG. 6 can include one or more features for the serial neural network of block diagrams described in other figures. For example, the common serial bus described in FIG. 6 can include one or more features for the common serial bus described in other figures.

In some cases, a neural network can be distributed across multiple chips. For example, some nodes can be configured on a first chip 606 and other nodes can be configured on a second chip 610. The serial bus 618 can connect to each of the chips to facilitate sending the outputs of certain nodes to the nodes that are to facilitate receiving such outputs.

In some cases, the destination identification data can used by a node on a different chip to determine whether the destination identification data matches an address corresponding to the chip. In some cases, the serial bus 618 can determine which chip to broadcast the data based on the destination identification data. For example, the serial bus 618 can receive input data from the input nodes 604 along with destination identification data that indicates that the input data should be broadcast to the first chip 606. The serial bus 618 can selectively broadcast the input data only to the nodes of the first chip 606, and not to the second chip 610. Likewise, when output data is received from the nodes 609 of the first chip 606, the output data can be combined with destination identification data that indicates the output data should be sent to the second chip 610 for further processing, such as for a second hidden layer. In some cases, the destination identification data can indicate a plurality of destinations, such as a plurality of chips to broadcast the data to.

Other Variations

Those skilled in the art will appreciate that additional system components can be utilized, and disclosed system components can be combined or omitted. Although some embodiments describe video data transmission, disclosed systems and methods can be used for transmission of any type of data. The actual steps taken in the disclosed processes may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (such as, DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, references to "a method" or "an embodiment" throughout are not intended to mean the same method or same embodiment, unless the context clearly indicates otherwise.

The corresponding structures, materials, acts, and equivalents of all means or step plus function elements in the claims below are intended to include any structure, material, or act for performing the function in combination with other claimed elements as specifically claimed. The description of the various embodiments of the present disclosure has been presented for purposes of illustration and description, but is not intended to be exhaustive or limited to the embodiments disclosed. Many modifications and variations will be apparent to those of ordinary skill in the art without departing from the scope and spirit of this disclosure. The example embodiments were chosen and described in order to best explain the principles of this disclosure and the practical application, and to enable others of ordinary skill in the art to understand this disclosure for various embodiments with various modifications as are suited to the particular use contemplated.

Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A system of performing neural network computations, the system comprising:
an input interface configured to receive input data for neural network processing; and
a common serial bus configured to serially transmit portions of the input data and a first source identification data to a plurality of nodes of a neural network, wherein in response to each portion of the input data being serially transmitted from the common serial bus, a count is incremented;
wherein each node of the plurality of nodes is configured to:
in response to the first source identification data matching one or more addresses stored at the node, store each portion of the input data in a respective register of the node; and
in response to the count meeting a threshold, for each node that stored the input data:
transmit the stored input data to a transfer function of the node;
receive an output of the transfer function;
add a second source identification data to the output of the transfer function; and
transmit the output of the transfer function with the second source identification data to each node of the plurality of nodes via the common serial bus.

2. The system of claim 1, further comprising a processor configured to load a pre-determined neural network with pre-determined weightings.

3. The system of claim 1, further comprising a processor configured to:
receive, via the input interface, one or more configuration parameters for the neural network; and
dynamically configure weightings for the neural network based on the one or more configuration parameters.

4. The system of claim 1, further comprising a processor that is configured to store data in response to the data corresponding to a particular source.

5. The system of claim 1, wherein each node of the plurality of nodes is further configured to store a plurality of data in response to the plurality of data corresponding to any of a plurality of predetermined sources.

6. The system of claim 1, wherein the one or more addresses stored at the node correspond to one or more nodes of a previous layer of the neural network.

7. The system of claim 1, wherein the common serial bus is configured to transmit data to each node of the plurality of nodes without storing the data in memory.

8. A method of performing neural network computations, the method comprising:
receiving input data for processing in a neural network comprising a plurality of nodes;
transmitting the input data and first source identification data to the plurality of nodes via a common serial bus, wherein the common serial bus serially transmits portions of the input data and the first source identification data to the plurality of nodes;
for each node of the plurality of nodes, in response to the first source identification data matching one or more addresses stored at the node:
storing each serially transmitted portion of the input data in a respective register of the node of the plurality of nodes; and
incrementing a count for each serially transmitted portion of the input data; and
in response to the count satisfying a threshold, for each node that stored the input data:
transmitting the stored input data to a transfer function of the node;
receiving an output of the transfer function;
adding a second source identification data to the output of the transfer function; and
transmitting the output of the transfer function with the second source identification data to each node of the plurality of nodes via the common serial bus.

9. The method of claim 8, wherein the common serial bus transmits the input data and the first source identification data to each node of the plurality of nodes without storing the input data or the first source identification data in memory.

10. The method of claim 8, further comprising, by the common serial bus, broadcasting any data received to each of the plurality of nodes.

11. The method of claim 8, wherein the plurality of nodes includes at least one node of an input layer of the neural network, at least one node of an output layer of the neural network, and at least one node of a hidden layer of the neural network.

12. The method of claim 8, wherein the input data corresponds to pixels of an image, and wherein the common serial bus transmitting the input data and the first source identification data serially includes transmitting each pixel of the image the input data serially to each node of the plurality of nodes.

13. The method of claim 8, wherein the plurality of nodes are disposed across a plurality of hardware processor chips or processor cores including a first and second hardware chip or processor core.

14. The method of claim 13, further comprising, by the common serial bus, broadcasting the input data and the first source identification data to the nodes disposed on the first hardware chip or processor core and the second hardware chip or processor core.

15. The method of claim 8, further comprising generating routing data, and broadcasting, by the common serial bus, the routing data with the input data and the first source identification data to each of the nodes of the plurality of nodes.

16. The method of claim 8, wherein the method further comprises, for each node that stored the input data:
resetting the count in response to receiving the output of the transfer function.

17. The method of claim 8, wherein the one or more addresses stored at the node correspond to one or more nodes of a previous layer of the neural network.

18. A system for performing neural network computations, the system comprising:
means for receiving input data for processing by a neural network comprising a plurality of nodes;

means for transmitting serially portions of the input data and first source identification data to the plurality of nodes; and means for processing, for each node of the plurality of nodes, in response to the first source identification data matching one or more addresses stored at the node:
    storing each serially transmitted portion of the input data; and
    incrementing a count for each serially transmitted portion of the input data;

wherein the means for processing is further for, in response to the count meeting a threshold, for each node that stored the input data:
    receiving an output of a transfer function; and
    adding a second source identification data to the output of the transfer function; and wherein the means for transmitting is further for serially transmitting the output of the transfer function with the second source identification data to each of the nodes of the plurality of nodes.

19. The system of claim 18, wherein the one or more addresses stored at the node correspond to one or more nodes of a previous layer of the neural network.

20. The system of claim 18, wherein the means for transmitting is further for transmitting the input data and the first source identification data to each node of the neural network without storing the data in memory.

\* \* \* \* \*